Sept. 4, 1945.　　　　G. A. CUTTER　　　　2,384,014
WELDING APPARATUS
Filed May 3, 1943　　　　3 Sheets-Sheet 1

INVENTOR.
GEORGE A. CUTTER
BY
Edgar H. Kent
ATTORNEY

Sept. 4, 1945.  G. A. CUTTER  2,384,014
WELDING APPARATUS
Filed May 3, 1943   3 Sheets—Sheet 2
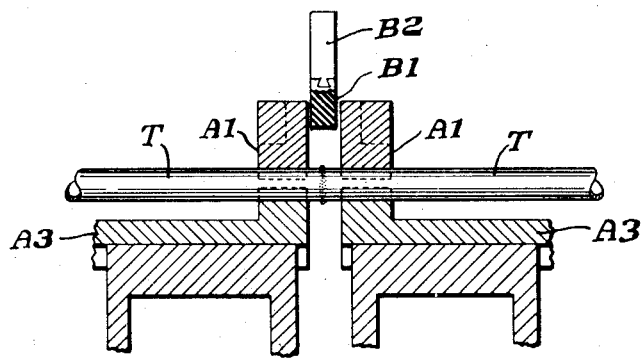
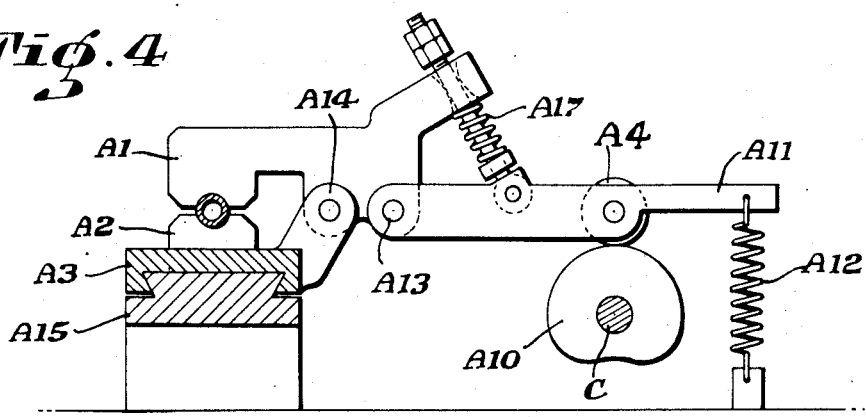
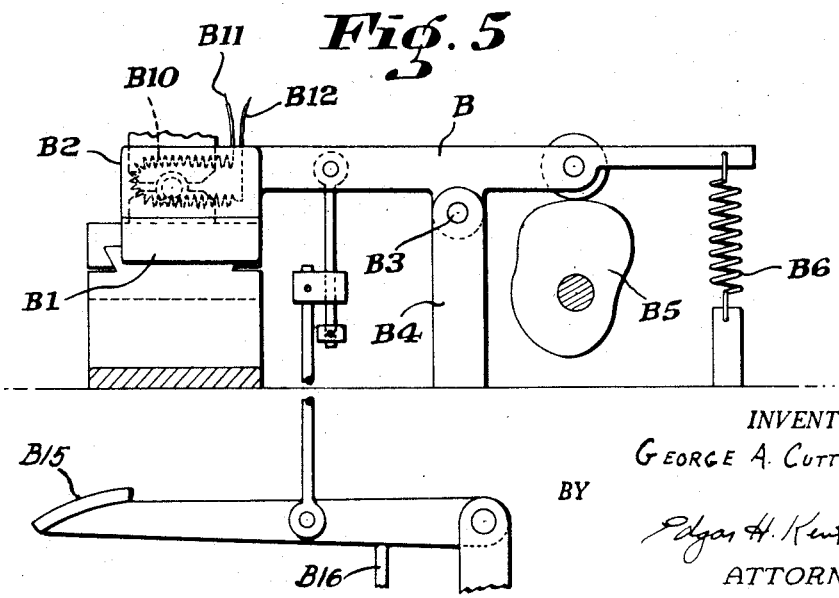
INVENTOR.
GEORGE A. CUTTER
BY
Edgar H. Kent
ATTORNEY Sept. 4, 1945.  G. A. CUTTER  2,384,014
WELDING APPARATUS
Filed May 3, 1943  3 Sheets-Sheet 3

INVENTOR.
GEORGE A. CUTTER
BY
Edgar H. Kent
ATTORNEY

Patented Sept. 4, 1945

2,384,014

UNITED STATES PATENT OFFICE 2,384,014

WELDING APPARATUS

George A. Cutter, Dedham, Mass., assignor to Thomson-Gibb Electric Welding Company, Lynn, Mass., a corporation of Massachusetts Application May 3, 1943, Serial No. 485,470

6 Claims. (Cl. 154—42)

The invention relates to welding apparatus and more particularly has for its object the provision of a novel machine for welding together the ends of pieces of thermoplastic material, such as pipes, tubes, or rods.

In the operation of the apparatus of the invention, the pieces are placed with their ends to be welded in aligned predetermined relative positions, their ends are simultaneously properly softened by pressing them against the opposite sides of a heater, the softened ends are separated slightly from the heater, the heater is removed from between them, and the hot and soft ends are pressed together to form the weld, which hardens on cooling.

A preferred form of apparatus of the invention is shown in the accompanying drawings wherein:

Fig. 3 is a view similar to Fig. 2 showing the completed weld;

Fig. 4 is a view, partly in vertical section and partly in side elevation, on the line 4—4 of Fig. 1 showing the clamps and the means for operating the upper clamping jaws;

Fig. 5 is a view, partly in vertical section and partly in side elevation, on the line 5—5 of Fig. 1, showing the lever carrying the heater and the work gauge and the means for operating them;

Figure 6:
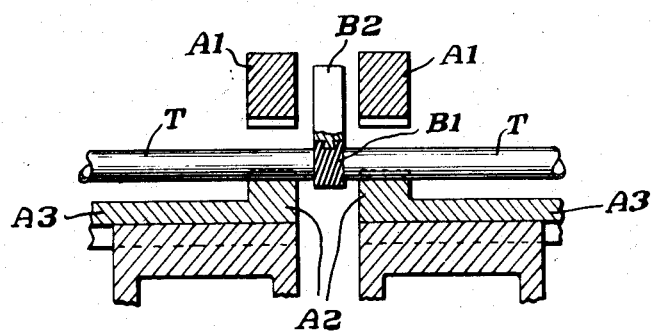
Fig. 6 is a view, partly in section, of the work placed in the machine with its ends against the gauge, preparatory to the automatic operation of the machine.

When the machine is at rest the upper jaws A1, A1 of the pairs of work holding clamps are raised above the lower jaws A2, A2 and the clamp carrying slides A3, A3 and the clamps are separated apart as these parts are shown in Fig. 6. The gauge B1 and the heater B2 on the forward end of lever B are in raised position, the gauge being insulated from the heater. The shaft C is at rest.

The operator depresses the foot pedal B15 against the stop B16, Fig. 5, to pull the forward end of lever B down and bring the gauge B1 into position in line with the jaws of the clamps when closed. The lever B is pivoted at B3 on a lug B4 on the frame and its rear end is lifted by a cam B5 on shaft C against the stress of a spring B6.

The operator places the work, namely the pieces T, T, on the lower members A2, A2 of the clamps with their ends abutted against the gauge B1, Fig. 6, thereby locating the ends of the work in proper alignment and relative position. He takes his foot off pedal B15 and the spring B6 restores the lever B to its initial position with the gauge raised up from between the ends of the work.

Figure 1:
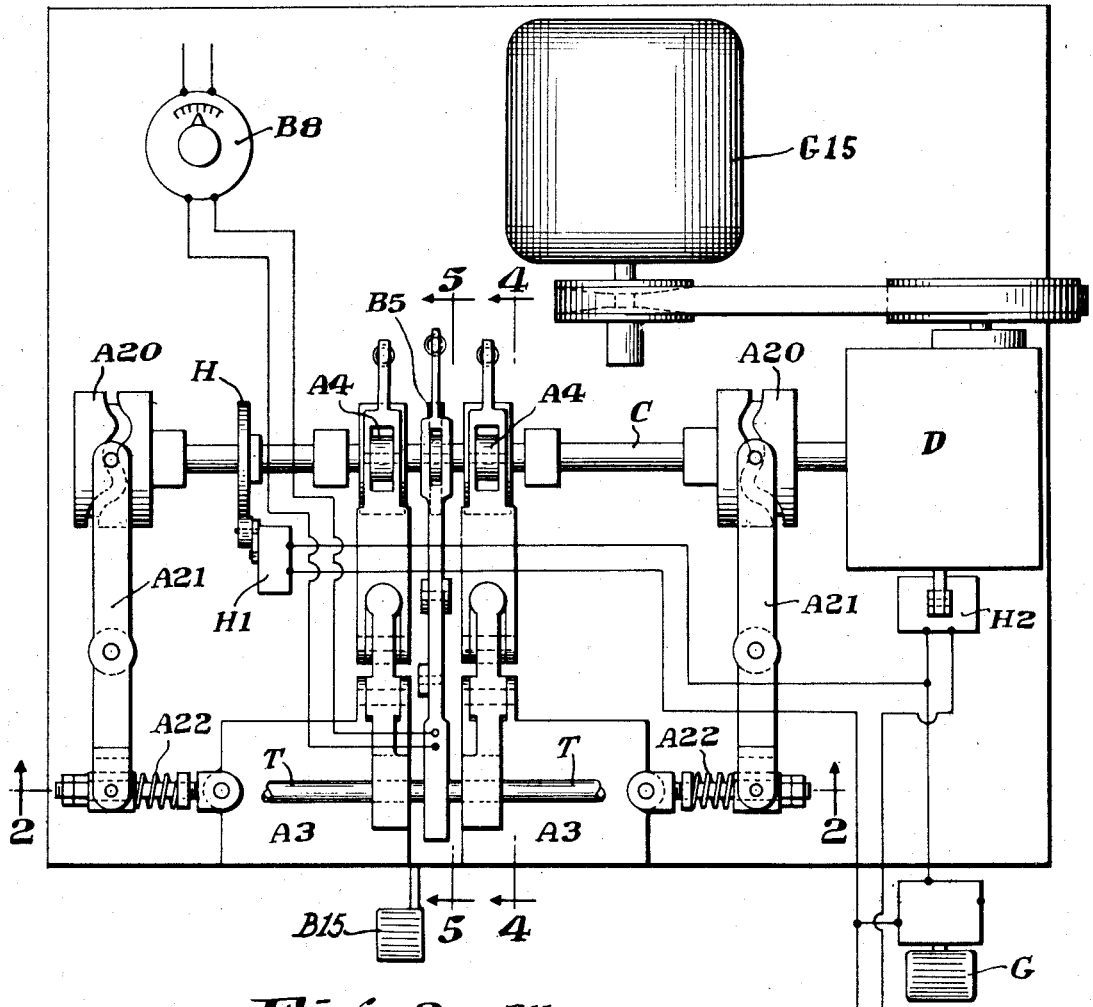
Fig. 1 is a plan view of the machine.
Figure 2:
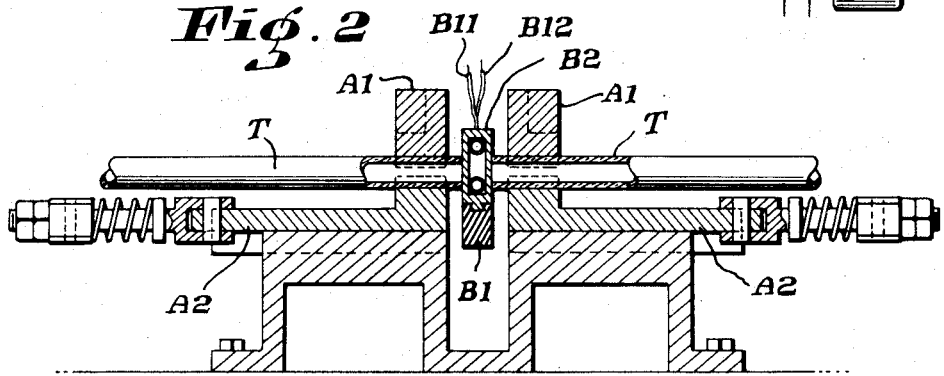
Fig. 2 is a vertical section on the line 2—2 of Fig. 1 with the ends of the work against the heater.

The operator starts the machine by stepping on the pedal G, Fig. 1, and thereafter its operation is entirely automatic. The depression of pedal G closes a circuit to the solenoid in H2 which causes the clutch in the box D to engage so that the shaft C begins to rotate as later described.

The rotation of the shaft C causes the cams A10, A10, Figs. 1 and 4, to lift the rear ends of the levers A11, A11 by means of follower rollers A4, A4 against the tension of the springs A12, A12 and thereby presses each upper jaw A1 of a clamp down on the work T. Each lever A11, Fig. 4, has pivoted at its front end at A13 an upper jaw A1, which is pivoted on a lug A14 on the slide A3, which is capable of sidewise movement on a dovetail on a track A15 on the frame. Between the rear end of a jaw A1 and the lever A11 is a spring A17 through which the jaw is pressed down yieldingly on the work T by the cam A10. Thereby the two pieces T, T of the work are clamped in their adjusted positions.

As the shaft C rotates, its cams A20, A20 rock the levers A21, A21 pivoted on the frame, Fig. 1, to move the slides A3, A3, and the clamps carried thereon slightly further apart so that, as the shaft C continues to rotate, the cam B5 depresses the front end of the lever B to bring the heater B2 between the ends of the pieces T, T, Fig. 5. The heater B2 has metal side plates between which is a heating coil B10 to which electricity is conducted by the wires B11, B12, from a suitable source. The current is controlled by a thermostat B8 to maintain the heater B2 at the proper temperature and to prevent overheating. The cams A10, A10 are wide enough to permit the followers A4, A4 to move sidewise thereon as the levers A11, A11 are moved sidewise with the slides A3, A3.

As the shaft C continues its rotation, the cams A20, A20 rock the levers A21, A21 to move the clamp carrying slides A3, A3 toward one another to press the ends of the work yieldingly (because of springs A22, A22) against the heated sides of the heater B2 on the forward end of the lever B. At the same time, the cam H on the shaft C closes an electric circuit through the timer H1, Fig. 1. The shaft C, having made one-half a revolution, automatically stops.

The timer, of any well known construction, is so adjusted that it permits the shaft C to dwell for a predetermined period of time, which is long enough to raise the temperature of the ends of the pieces T, T pressed against the sides of the heater B2 to such a degree that those ends become soft and plastic. Then the timer causes the solenoid in H2 to operate the clutch in the box D to restart the shaft C.

As the shaft C rotates, the cams A20, A20 and levers A21, A21 move slides A3, A3 and the work holding clamps A1, A2 carried thereon apart to separate the hot and softened ends of the pieces T, T from the sides of the heater B2. At the same time the cam B5 permits the spring B6 to raise the heater B2 up from between the ends of the pieces T, T into the position shown in Fig. 3.

The continued rotation of the shaft C causes the cams A20, A20 and levers A21, A21 to move the slides A3, A3 and the work holding clamps carried thereon towards one another to press the hot softened ends of the pieces T, T together with a yielding pressure and thereby weld those ends together. The weld hardens when it cools.

The continued rotation of the shaft C causes the cams A10, A10 to permit the springs A12, A12 to lift the upper jaws A1, A1 off the work and the cams A20, A20 to separate the slides A3, A3, and the clamps carried thereby from one another. The shaft C then stops at the end of its second half rotation with the parts in their initial position. The operator removes the welded work.

Figure 7:
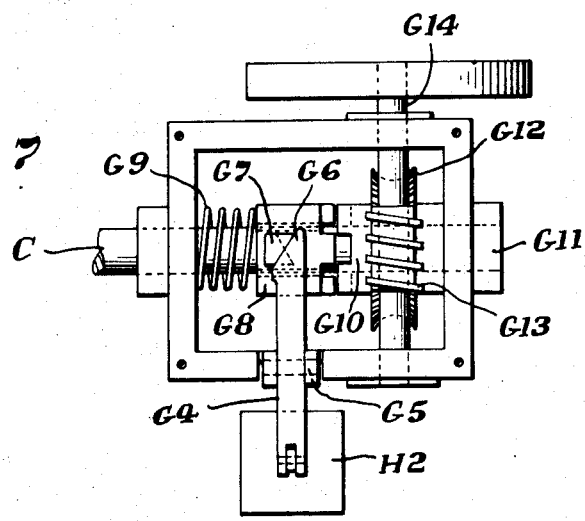
Fig. 7 is a plan view and Fig. 8 is an elevation of the means to start and stop the main shaft of the machine.
Figure 8:
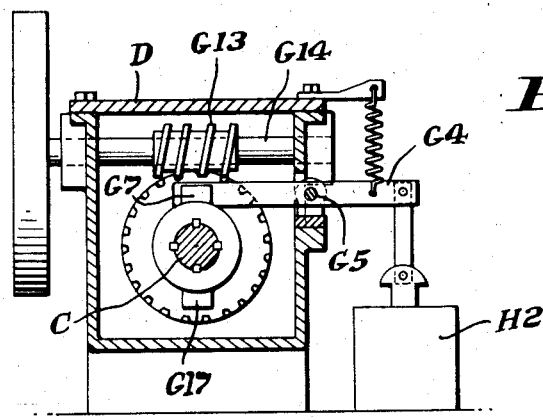

The operation of starting and stopping the shaft C will be understood from Figs. 7 and 8.

The depression of the pedal G by the operator closes a circuit through the solenoid in H2 to rock the lever G4 about its pivot G5 to lift its beveled end G6 above the lug G7 on the clutch member G8 splined on shaft C. The spring G9 forces the clutch member into engagement with the clutch G10 fast on a shaft G11 having a worm wheel G12 driven by a worm G13 on the driving shaft G14 which is continuously operated by a motor G15. When the shaft C has completed a half revolution lug G17, opposite to lug G7, engages the end G6 of lever G4 and disengages the clutch member G8 from the clutch G10, thereby causing the shaft C to stop. The shaft C dwells until the timer H1 closes the circuit to operate the solenoid to rock lever G4 to release its end G6 from the lug G17 thereby permitting spring G9 to engage the clutch member G8 with the clutch G10 to start the rotation of shaft C. At the end of a half revolution the end G6 of lever G4 engages lug G7 and disengages the clutch to stop the shaft.

Having described a preferred embodiment of the apparatus of the invention, I claim:

1. An apparatus for welding together two pieces of thermoplastic material which comprises a pair of clamps for receiving the pieces in spaced alignment, means for closing the clamps on the pieces, a heater, means for inserting the heater into the space between the pieces in said clamps, means for moving said clamps to press said pieces against opposite sides of said heater to soften the surfaces of the pieces in contact with the heater and to withdraw the softened surfaces from the heater, means to remove the heater from between the softened surfaces of the pieces, and means for moving said clamps to press said softened surfaces of said pieces together to form the weld, said means for moving the clamps to press the pieces against the heater and to press their softened surfaces together including spring means for exerting a yielding pressure on said pieces during said operations.

2. An apparatus for welding together two pieces of thermoplastic material which comprises a pair of clamps for receiving the pieces in spaced alignment, means for closing the clamps on the pieces, a heater comprising a hollow plate-like member provided in its interior with an electric heating element and having an electric heating circuit which includes thermostat means for automatically controlling the heating of said member by said element, means for inserting the heater into the space between the pieces in said clamps, means for moving said clamps to press said pieces against opposite sides of said heater to soften the surfaces of the pieces in contact with the heater and to withdraw the softened surfaces from the heater, means to remove the heater from between the softened surfaces of the pieces, and means for moving said clamps to press said softened surfaces of said pieces together to form the weld.

3. An apparatus for welding together two pieces of thermoplastic material which comprises a support, a pair of movable clamps for positioning the pieces in spaced alignment mounted on said support, means for closing the clamps on the pieces, a heated plate member, means for inserting said plate member into the space between the pieces in said clamps, means for moving said clamps to press said pieces against opposite sides of said plate member to soften the surfaces of the pieces in contact with the plate member and thereafter to withdraw the softened surfaces from the plate member, means for removing the plate member from between the withdrawn softened surfaces of the pieces, and means for thereupon initiating further movement of said clamps to press said softened surfaces of said pieces together to form the weld.

4. An apparatus for welding together two pieces of thermoplastic material which comprises a pair of clamps for receiving the pieces, a gauge arranged to be removably positioned between pieces placed in the clamps to be engaged at opposite sides by the pieces and provide a predetermined space between them, means for closing the clamps on the pieces while in engagement with said gauge, a heated plate member, means for withdrawing the gauge from between the clamped pieces and moving the heated plate member into the space between said pieces, means for moving said clamps toward said heated plate to press said pieces into contact with its opposite sides to soften the contacting surfaces of the pieces and means for initiating further movement of said clamps to withdraw the softened surfaces from the heated plate, means to remove the heated plate member from between the pieces, and means for moving said softened surfaces of said pieces together to form the weld.

5. An apparatus for welding together two pieces of thermoplastic material which comprises a pair of clamps for receiving the pieces in spaced alignment, means for closing the clamps on the pieces, a heater, means for inserting the heater into the space between the pieces in said clamps, means for moving said clamps to press said pieces against opposite sides of said heater to soften the portions of the pieces in contact with the heater, a timer, and means, set in operation by the timer after said pieces have been pressed against the heater for a predetermined interval long enough to soften said portions, to move said clamps to withdraw said portions from the heater, to remove the heater from between said portions, and to move said clamps to press said softened portions of said pieces together to form the weld.

6. An apparatus for welding together two pieces of thermoplastic material which comprises a pair of clamps for receiving the pieces in spaced alignment, a heater, a drive shaft, drive connections to said shaft including a clutch, means for automatically disengaging said clutch after a predetermined partial revolution of said shaft, means for engaging said clutch to produce a first partial revolution of said shaft, means operated by said first partial revolution of said shaft to close the clamps on the pieces, to insert the heater between the pieces and to move the clamps so that the pieces are pressed against opposite sides of the heater, timer mans for engaging said clutch to produce a second partial revolution of said shaft after a period of time long enough for the portions of the pieces pressed against the heater to become softened, and means operated by said second partial revolution of said shaft to move said clamps to withdraw said softened portions of the pieces from the heater, to remove the heater from between said portions, to move said clamps to press said softened portions of said pieces together to form the weld and to open the clamps.

GEORGE A. CUTTER.